Aug. 6, 1968  G. H. RAWCLIFFE ET AL  3,396,295

ROTARY ELECTRIC MACHINES

Filed Oct. 15, 1965  6 Sheets-Sheet 1

INVENTORS
Gordon Hindle Rawcliffe
William Fong
BY
Martin E. Hogan, Jr.
ATTORNEY 3,396,295
ROTARY ELECTRIC MACHINES
Gordon Hindle Rawcliffe and William Fong, Bristol,
England, assignors to National Research Development Corporation
Filed Oct. 15, 1965, Ser. No. 496,465
Claims priority, application Great Britain, Oct. 19, 1964,
42,575/64
13 Claims. (Cl. 310—162)

ABSTRACT OF THE DISCLOSURE

A two-speed reluctance motor having a stator which carries a pole-changing winding, for example a 3-phase, pole-amplitude modulation, pole-changing winding. The rotor has flux-barriers adapted to both alternative stator winding pole-numbers. Particularly, the rotator angular permeance distribution is defined by the expression:

$$P_o + P_x \cos X\theta + P_y \cos y\theta$$

where the alternative pole-numbers are $x$-poles and $y$-poles and $P_o$, $P_x$ and $P_y$ are different permeance coefficients. Further, multiple-speed reluctance motors are disclosed.

---

This invention relates to electric motors having a single-phase, three-phase or polyphase stator winding and a form of squirrel cage rotor. This invention is particularly, but not solely, concerned with such motors in which the stator winding is a pole-amplitude modulated, pole-changing winding.

The object of the invention is to provide such motors having a form of squirrel-cage rotor suitable for operation at alternative speeds, in combination with a pole-changing armature winding, particularly a pole-amplitude modulated pole-changing armature winding.

Accordingly, the present invention provides a pole-changing electric motor having a pole-changing armature winding and a form of squirrel cage rotor having different permeance values at different angular positions around its axis. When the squirrel cage rotor is subjected to the magnetic field set up by the armature winding, according to the pole-number to which it is switched, a reluctance torque is established for rotation of the rotor at substantially synchronous speed at both, or all, the pole-numbers of the armature winding field.

Preferably, the armature winding is a pole-amplitude modulated winding providing alternative pole-numbers in close-ratio, that is in ratio less than 2:1.

The permeance of the rotor may be varied at different angular positions around the rotor axis by omitting rotor teeth at spaced angular positions, relatively to the regular distribution of teeth around the rotor periphery, by retaining a regular distribution of teeth and removing portions of rotor iron at spaced angular regions or by grading the air gap between the outer rotor circumference and the inner stator frame circumference, either progressively or stepwise, around the machine axis, or by more than one of the above means in combination.

In order that the invention may be readily carried into practical effect, a number of embodiments will now be described in detail, by way of example, with reference to the accompanying drawings, of which:

It is known, for single-speed, fractional horse-power electric motors, in which the speed is to be maintained constant, without use of a D.C. energised rotor winding as in asynchronous machine, to make use of a reluctance torque developed by a form of squirrel cage rotor of irregular shape as compared with a regular squirrel-cage rotor for conventional induction motor.

To this end, some 40% to 50% of the rotor teeth of the regular cage may be omitted from selected peripheral positions, or a regular cage may be used and selected areas of rotor iron, behind the regular cake, may be omitted. Two such rotors, for a 4-pole machine, are shown in FIGS. 1 and 2, respectively.

Figure 1:
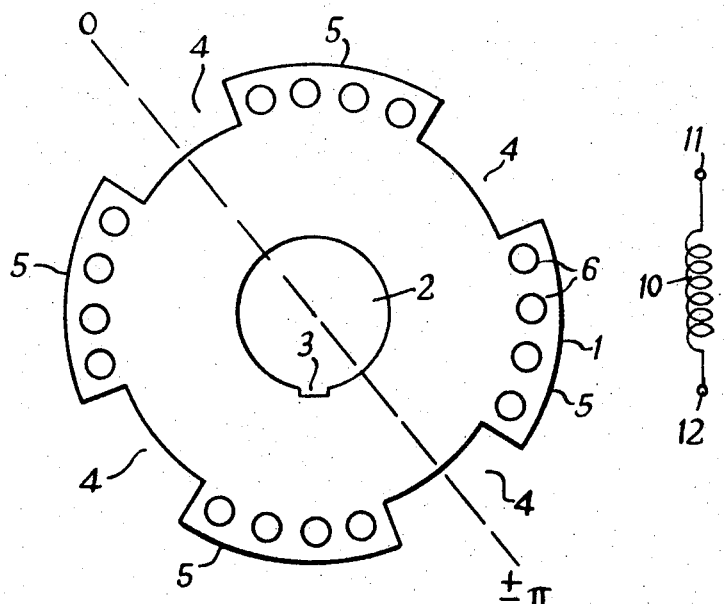
FIG. 1 is a sectional diagram in a plane at right angles to the axis of a known form of squirrel cage rotor for a single-speed machine, showing peripheral gaps resulting from the removal of selected rotor teeth around the periphery.
Figure 2:
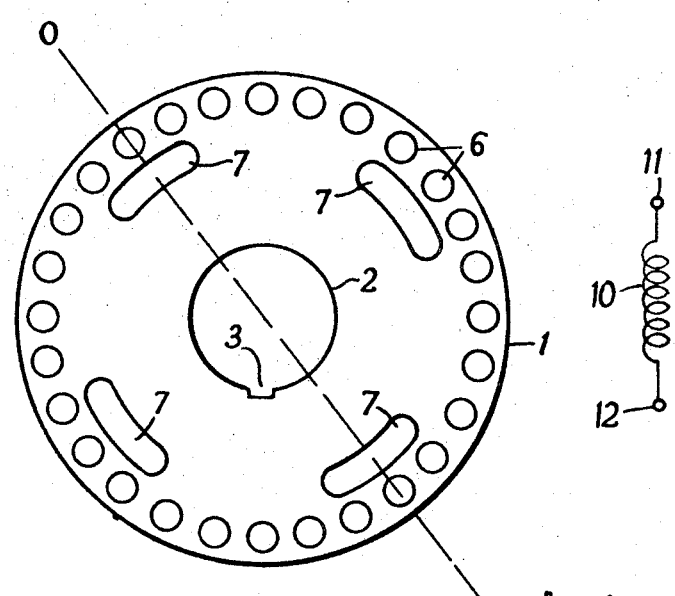
FIG. 2 shows the corresponding rotor with a regular distribution of teeth and having selected portions of the rotor iron removed.

FIGS. 1 and 2 show cross-sections through the laminated iron core 1 of a rotor, in place to which the rotor axis is normal. The core 1 has a central aperture 2 and keyway 3, for mounting the core on the shaft of the machine, not shown. A reference diameter of the core 1 is shown by the dash-line $0 \pm \pi$.

A stator winding for a single pole-number is indicated by the winding 10 connected between terminals 11 and 12. The winding 10 is diagrammatic only and may indicate a single-phase, three-phase or polyphase stator winding.

In the regular cage form of the rotor, shown in FIG. 2, the rotor has 28 teeth, some of which are referenced 6 in the figure.

In the modified form of the regular cage construction, shown in the example of FIG. 1, a group 4 of three out of each sequency of seven teeth are omitted, to leave four lands 5, each of four teeth, arranged symmetrically about the reference diameter $0$, $\pm\pi$.

In the alternative construction shown in FIG. 2, all 28 teeth 6 are retained, but four areas 7 of rotor iron are removed, each area comprising an arc extending behind a group of three teeth in each group of seven consecutive teeth.

Figure 3:
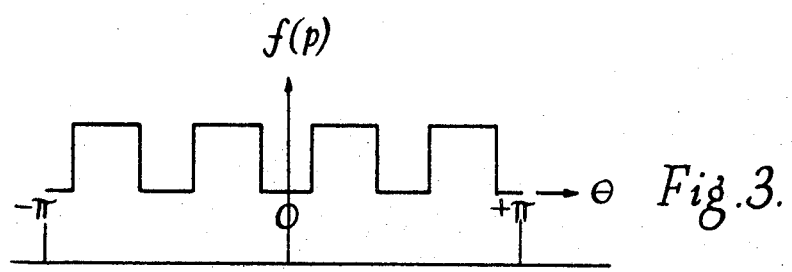
FIGS. 3, 4 and 5 are permeance distribution curves referred to in the explanation of the invention.

FIG. 3 is a diagram showing the permeance distribution of the rotor of FIG. 1 or the rotor of FIG. 2 with angular distance from the reference radius 0.

In FIG. 3, permeance magnitude increases vertically. The reference radius 0 coincides with the centre of the figure and permeance values extend leftwards to the reference diameter at $-\pi$ and rightwards to the reference diameter at $+\pi$.

The angular permeance distribution shown in FIG. 3 can be represented mathematically by a Fourier series of the form:

$$f(p) = P_o + P_4 \cos 4\theta + m + n \text{ etc.} \quad (1)$$

where $f(p)$ is the permeance function, $P_o$ is a constant, $P_4 \cos 4\theta$ represents a dominant second-harmonic, that is an 8-pole component, relative to the 4-pole field of the armature winding and the terms $m$, $n$ represent higher order harmonics.

It can be shown that the ratio: $Xd/Xq$, where $Xd$ is the direct-axis reactance and $X_q$ is the quadrature-axis reactance for such an arrangement is proportional to:

$$\frac{P_o + \tfrac{1}{2}P_4}{P_o - \tfrac{1}{2}P_4} \qquad (2)$$

Thus, it is seen that synchronous operation of a single-speed machine having a form of squirrel cage rotor as shown in FIG. 1 or FIG. 2, depends principally upon the magnitudes of the coefficients of the constant component and of the second-harmonic component.

A large ratio of the values $Xd/Xq$ is desirable for high torque.

The foregoing discussion relates to single-speed motors, that is motors having an armature winding providing only one pole-number.

Pole-changing single-phase, three-phase and polyphase windings are known providing, by alternative switching, two or more alternative pole-numbers.

In particular, there are described in British Patents No. 900,600, No. 926,101 and No. 968,988, three-phase windings providing alternative pole-numbers by the method of pole-amplitude modulation. The first two patents are particularly concerned with alternative pole-numbers in close-ratio, that is less than 2:1. The third patent includes examples of alternative pole-numbers in wide ratio, greater than 2:1. Further, Patent No. 966,576 describes single-phase windings providing alternative pole-numbers by pole-amplitude modulation.

The object of the present invention, expressed in the terms used in the foregoing discussion, is to provide a form of squirrel cage rotor having an angular permeance distribution of the form:

$$f(p) = P_o + P_x \cos x\theta + P_y \cos y\theta + \text{et cetera} \qquad (3)$$

Such a rotor, used in a machine with an armature winding able to provide alternatively an $x$-pole field and a $y$-pole field, will rotate substantially synchronously in both the $x$-pole field and the $y$-pole field.

In a first practical example of the present invention, a pole-changing machine has a three-phase, 4-pole/6-pole, pole-amplitude modulated armature winding, for example, the winding shown in FIG. 21 of Patent No. 988,726.

For a squirrel cage rotor according to the invention to rotate synchronously by reluctance torque in both a 4-pole and 6-pole field, its angular permeance distribution is required to be of the form:

$$f(p) = P_o + P_4 \cos 4\theta + P_6 \cos 6\theta + \text{et cetera} \qquad (4)$$

To meet the requirement of equal torque at the two speeds, the coefficients $P_4$ and $P_6$ should be approximately equal to each other.

Consequently, the required form:

$$f(p) = P_o + P(\cos 4\theta + \cos 6\theta) + \text{et cetera} \qquad (5)$$

$$= P_o + 2P(\cos 5\theta)(\cos \theta) + \text{et cetera} \qquad (6)$$

Figure 4:
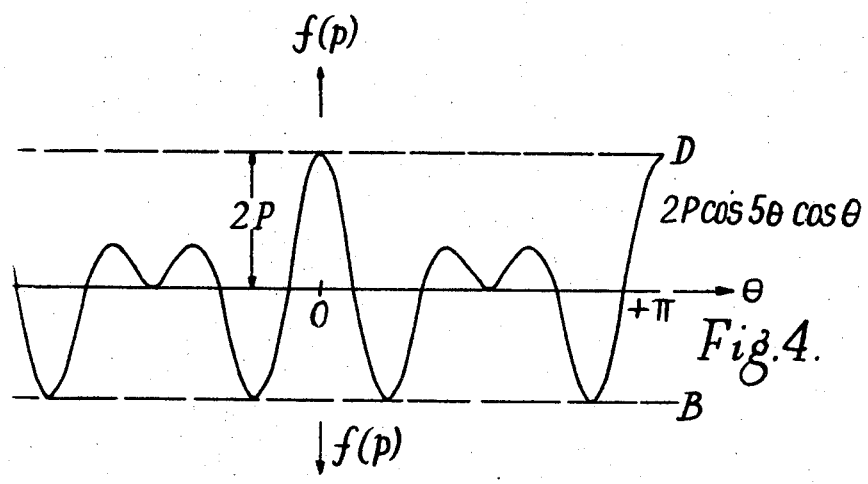

FIG. 4 is a graph showing an angular permeance distribution, between the limits $-\pi$ to $+\pi$, corresponding to the Expression 5 above. The amplitude of permeance ($p$) increases vertically, the line 0 representing the value $P_o$ and the distance from the line 0 to the line C–D representing the value 2P. The line A–B represents the minimum permeance values of the expression.

If the line 0 is taken as the horizontal axis ($p=0$) the term $P_o$ is thereby removed from the expression.

If either the line A–B or the line C–D is taken as the horizontal axis ($p=0$), an ideal angular permeance distribution, containing no higher order harmonic terms, as are included in the words "et cetera" in the Expressions 3 to 6, results.

Figure 5:
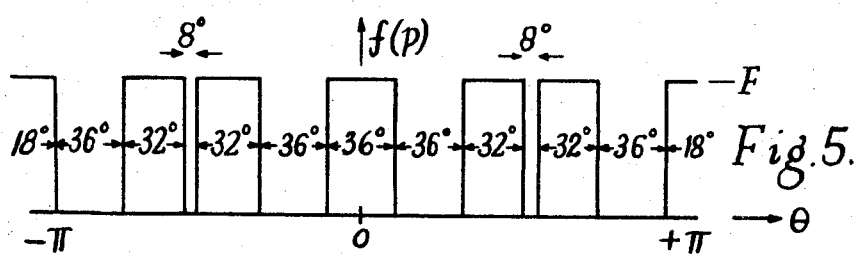

FIG. 5 is a curve of a bi-value expression approximating closely to the continuous Expression 5. FIG. 5 shows an expression having either the value "$P_1$" or the value "0." The angular distribution of the portions alternating in value form "$P_1$" to "0," between the limits $-\pi$ and $+\pi$, are shown in the figure.

Figure 6:
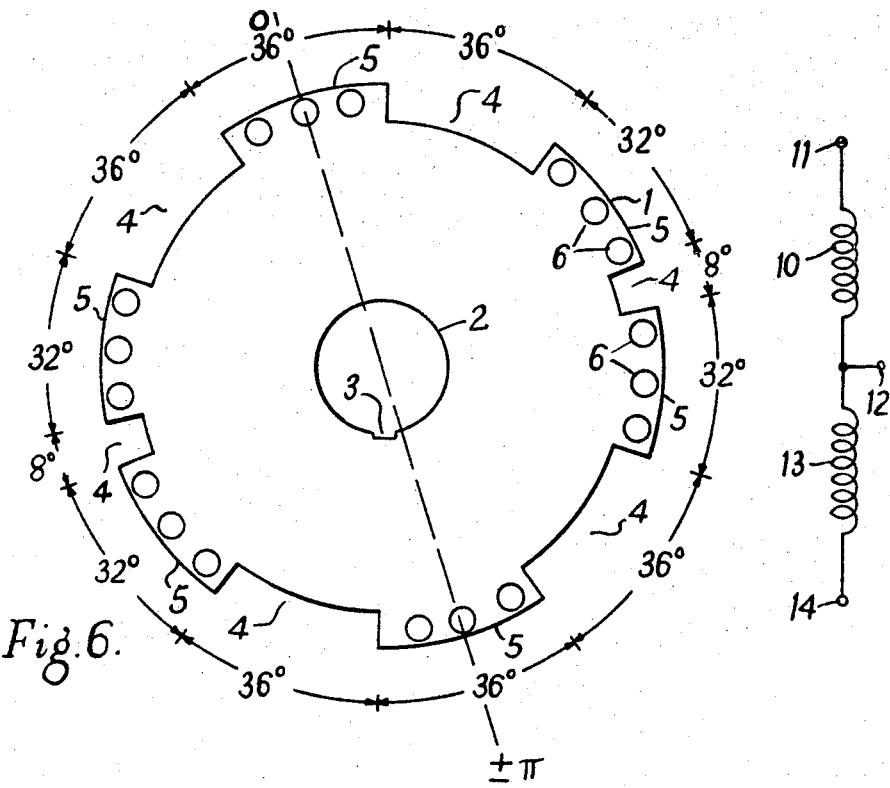
FIGS. 6 and 7 show corresponding rotor suitable for a 4-pole/6-pole pole-changing machine according to the present invention.

FIG. 6 shows in cross section a form of squirrel cage rotor, derived from a regular cage form having 32 teeth 6, from which selected teeth have been omitted at regions 4 to leave lands 5 corresponding to the angular distribution of FIG. 5 and hence having an angular permeance distribution corresponding to FIG. 4.

When the form of squirrel cage rotor shown in FIG. 6 is used in a machine having a 4-pole/6-pole, pole-changing winding, it will rotate at substantially synchronous speed when the armature winding is switched to provide either the 4-pole or the 6-pole field.

A pole-changing stator winding is represented by the windings 10 and 13 connected between terminals 11, 12 and 12, 14 respectively. The windings 10 and 13 may be two single pole-number windings wound into the stator slots. Pole-changing may be effected by selecting either winding 10 or winding 13. In the case of a pole-amplitude modulation, pole-changing winding, both windings 10 and 13 are used for both pole-numbers, being series-connected for one pole-number and parallel-connected for the other.

As for FIGS. 1 and 2, the stator windings are diagrammatic only and may represent single-phase, three-phase or polyphase stator windings.

Figure 7:
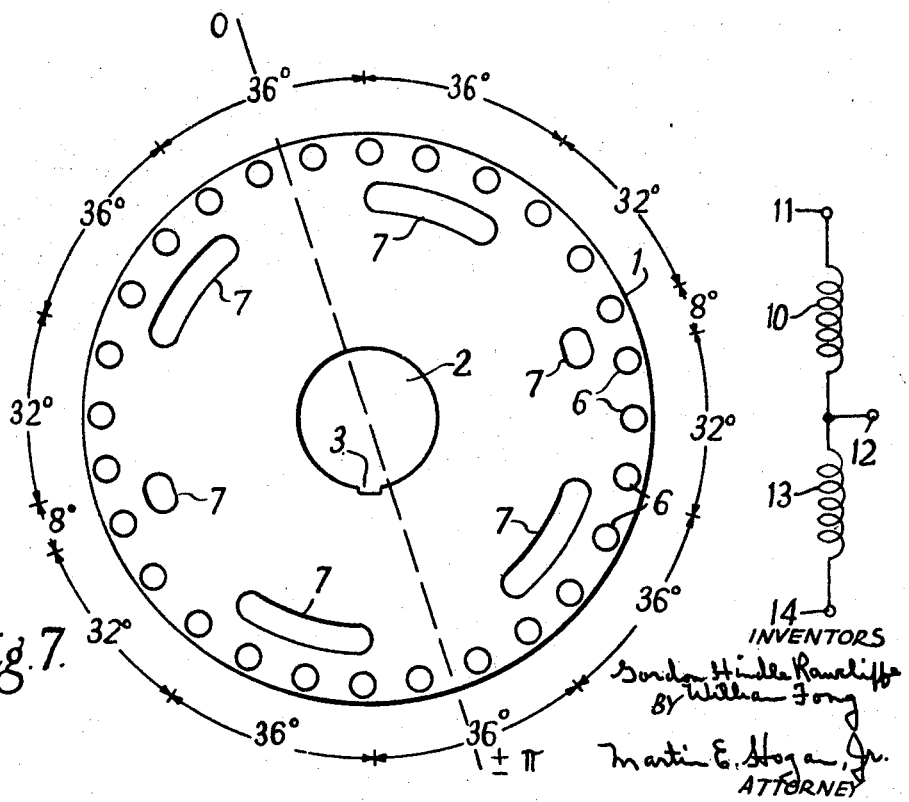

FIG. 7 shows a corresponding form of squirrel cage rotor having a regular cage with 28 teeth and having portions 7 removed from the rotor iron, behind the cage, to provide substantially the same angular permeance distribution as the rotor of FIG. 6. The angles subtended at the rotor axis by the removed portions 7 of rotor iron and the angular spacing of the portions 7 are shown by the figures on the outer circumference of the figure.

Referring again to FIG. 5, it will be noted that the line 0 corresponds to the value $p=0$ and the line E–F corresponds to the value $p=P_1$. The diagram can be revalued, with no change of its form, by the line E–F representing the value $p=0$ and the line 0 representing the value $p=P_1$. The expression shown is then the inverse of FIG. 5.

Figure 8:
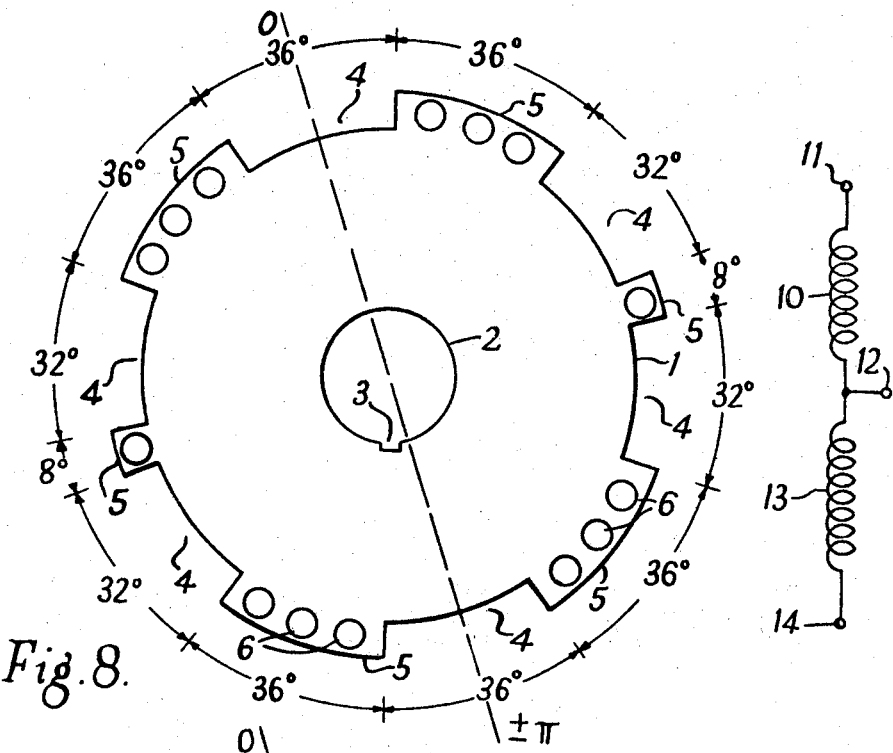
FIGS. 8 and 9 show corresponding rotors of inverse form to those of FIGS. 6 and 7, respectively.

FIG. 8 shows a rotor construction which is correspondingly the inverse of that of FIG. 6.

Figure 9:
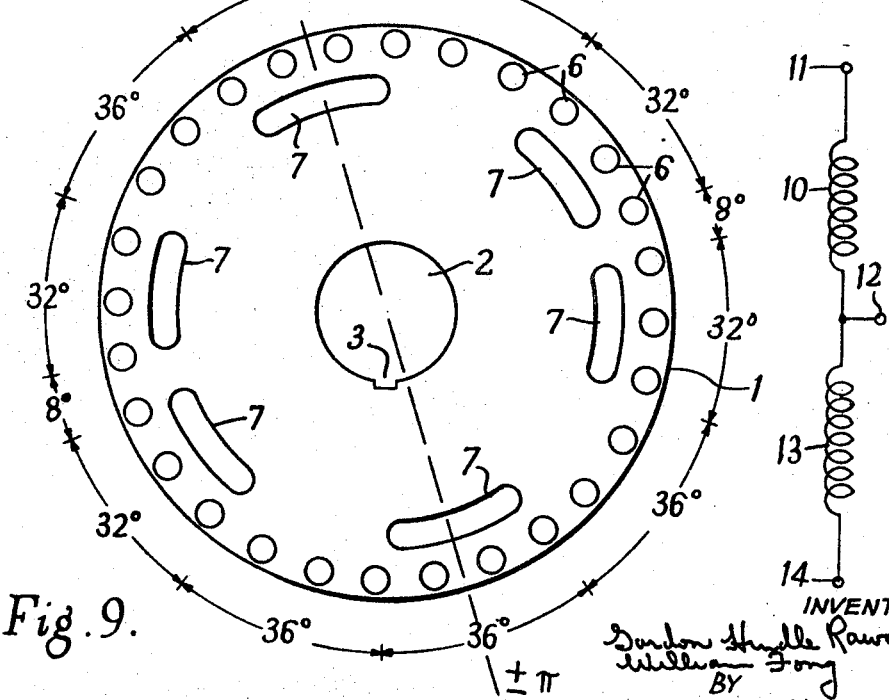

FIG. 9 shows a rotor construction which is the inverse of that of FIG. 7. The portions 7 of iron removed in the two forms follow in the same angular distribution in the two forms but a portion 7 removed in FIG. 7 corresponds to a portion remaining in FIG. 9 and a portion remaining in FIG. 7 corresponds to a portion 7 removed in FIG. 9.

Any one of the forms of squirrel cage rotor of FIGS. 6 to 9 could be used with a pole changing 4-pole/6-pole machine.

The forms of rotor punching of FIGS. 6 and 7 and the inverse forms of FIGS. 8 and 9 differ from each other in the amount of iron removed, relative to the regular punching. The form with the less iron gives the higher torque but permits a larger magnetising current to flow.

Figure 10:
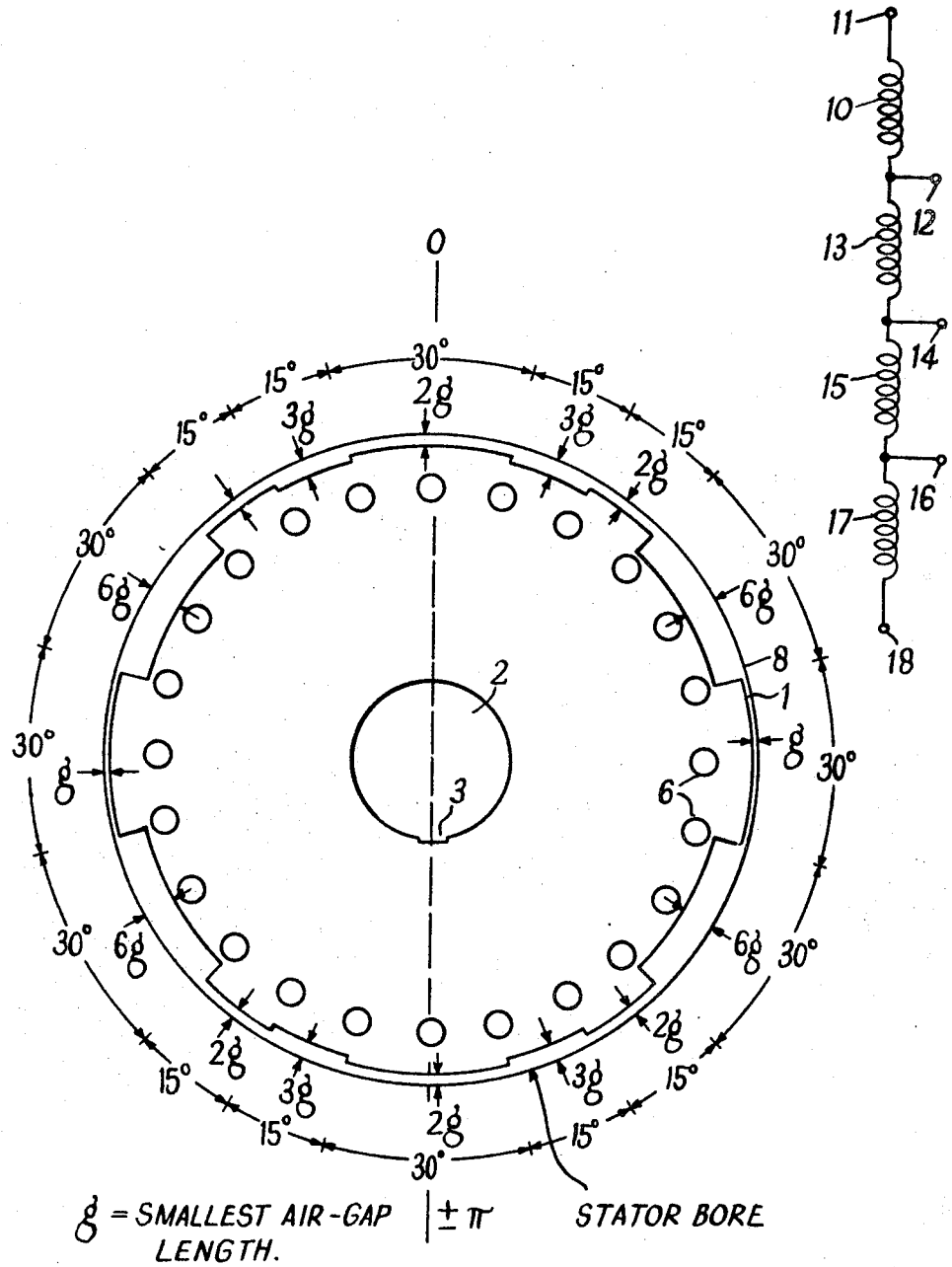
FIG. 10 shows a rotor suitable for a pole-changing 4-pole/6-pole/8-pole machine according to the present invention.

Another embodiment of the invention provides a three-speed motor. In particular, FIG. 10 shows a form of squirrel cage rotor suitable for a 4-pole/6-pole/8-pole pole-changing machine. Furthermore, this embodiment of the invention illustrates the manner of varying the angular permeance distribution of the rotor by varying the rotor-to-stator gap around the rotor axis.

In FIG. 10, corresponding parts are referenced by the same numerals used in FIGS. 1 and 2 and FIGS. 6 to 9. In addition, the inner circumference of the stator frame is shown by the line 8.

It will be seen that the rotor 1 has a regular distribution of teeth 6 but the gap between its outer circumference and the inner circumference 8 of the stator is varied stepwise around the rotor circumference. The gap, throughout the circumference, has one of four values:

$g$, $2g$, $3g$ and $6g$, the last three being multiples of the minimum gap dimension "$g$." The magnitude of the gap throughout the circumference and the angles subtended by the steps at the rotor axis are shown by the radial figures and by the figures on the outer circumference of the figure, respectively.

A pole-changing stator winding providing three different pole-numbers is represented by the windings 10, 13, 15 and 17 serially connected between terminals 10, 12, 14, 16 and 18 respectively. In one suitable embodiment of such a winding, known for example from Patent No. 986,379, the three pole-numbers are obtained by series, 2-parallel and 4-parallel connection of the windings 10, 13, 15 and 17. This embodiment is a three-phase winding, but the stator winding may alternatively be a single-phase or a polyphase winding.

Figure 11:
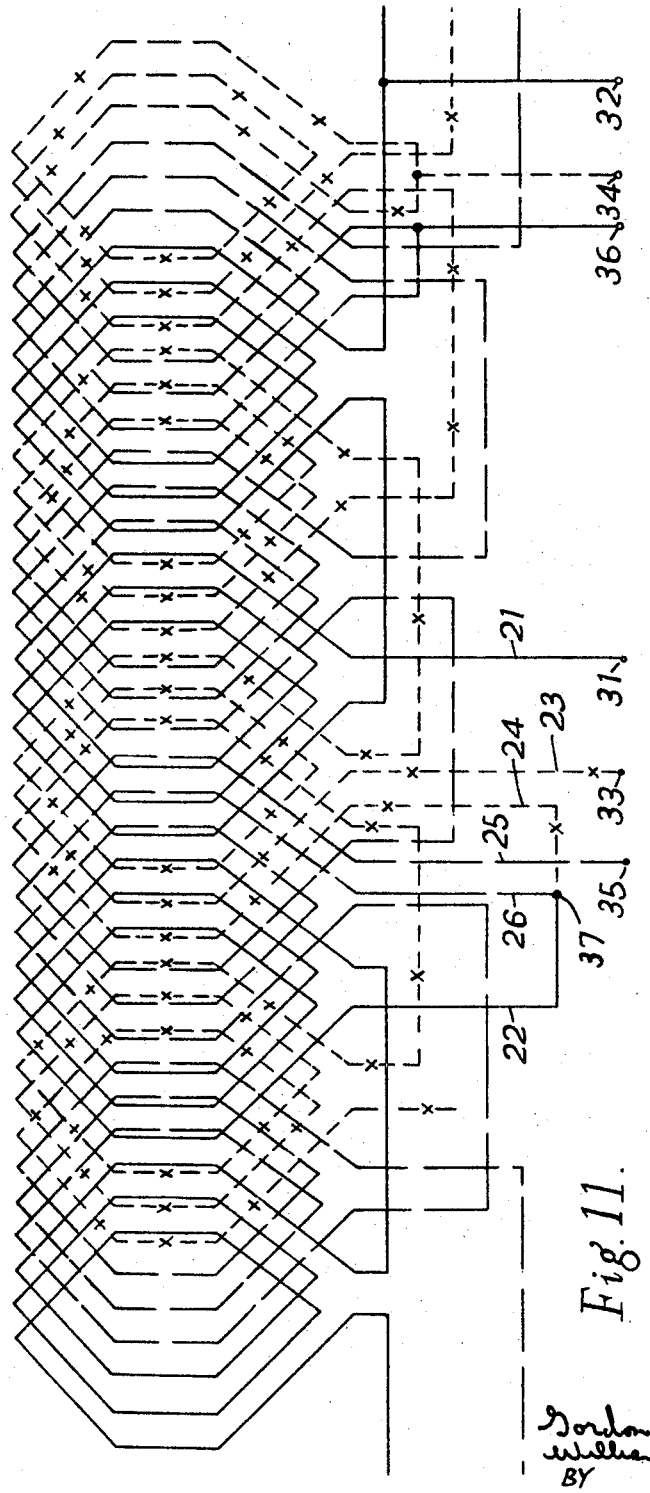
FIG. 11 is a slot winding diagram of a three-phase, pole-changing, 4-pole/6-pole stator winding suitable for use with the rotors of FIGS. 6 and 9.

FIG. 11 shows a three-phase, 4-pole/6-pole, pole-changing winding wound on a 36-slot stator frame.

The stator winding comprises three phase-windings each comprising two parts. Thus, phase-windings A, B and C respectively comprise winding parts 21, 22, 23, 24 and 25, 26 connected between terminals 31, 32, 37; 33, 34, 37 and 35, 36, 37.

The three phase-windings are star-connected at terminal 37 and are series-star connected for 6-poles and parallel-star connected for 4-poles.

The stator winding of FIG. 11 thus provides a three-phase example of the 4-pole/6-pole stator winding represented at 10 and 13 in FIGS. 6 to 9.

A further embodiment of the invention provides a machine for synchronous operation at four speeds. This machine has two 2-speed windings wound in the same stator frame. One suitable form of squirrel cage rotor has graded air gaps around its circumference, similar in principle to that of FIG. 10 again having a gap distribution with four alternative values, three being multiples of the minimum gap dimension.

Another suitable form of squirrel cage rotor comprises two groups of rotor punchings arranged along the rotor shaft, one group responding to two of the pole-numbers and the other group responding to the other two pole-numbers.

What we claim is:

1. A pole-changing electric motor of the reluctance type having wound stator and squirrel cage rotor parts defining an air gap therebetween, said stator having a pole-changing winding providing at least first and second alternative pole-numbers, said rotor being of ferromagnetic material and shaped to provide different permeance values at different angular positions around its axis, defining poles corresponding to both said first and second pole-numbers, whereby, when said stator winding is switched to either one of said first and second pole-numbers, a reluctance torque is established for substantially synchronous running at said pole-number.

2. A pole-changing electric motor as claimed in claim 1 in which the squirrel cage rotor is shaped by the omission of rotor teeth at spaced apart angular positions around the rotor axis.

3. A pole-changing electric motor as claimed in claim 1 in which the squirrel cage rotor is shaped by the omission of material between the rotor axis and rotor circumference, at spaced apart angular positions around the rotor axis.

4. A pole-changing electric motor as claimed in claim 1 in which the squirrel cage rotor is shaped by variation of width of said air gap between the stator inner circumference and the rotor outer-circumference at spaced apart angular positions around the rotor axis.

5. A pole-changing electric motor as claimed in claim 1 in which the angular permeance distribution of the squirrel cage rotor includes terms in $\cos x\theta$ and $\cos y\theta$, where $\theta$ is the angular distance around the rotor axis from an arbitrary reference radius and $x$-poles and $y$-poles are respectively said first and second pole-numbers.

6. A pole-changing electric motor as claimed in claim 5 in which the angular permeance distribution of the rotor is of the form:

$$P_0 + P_x \cos x\theta + P_y \cos y\theta$$

where $P_0$, $P_x$ and $P_y$ are different permeance coefficients.

7. A pole-changing electric motor as claimed in claim 5 in which the angular permeance distribution of the rotor is of the form:

$$P_0 + P_x \cos x\theta + P_y \cos y\theta$$

where $P_0$, $P_x$ and $P_y$ are permeance coefficients and $P_x$ and $P_y$ are of substantially equal value.

8. A pole-changing electric motor as claimed in claim 1 in which said stator winding is a pole-amplitude modulation, pole-changing winding.

9. A pole-changing electric motor as claimed in claim 8 in which said stator pole-changing winding provides first and second pole-numbers in close-ratio, less than 2:1.

10. A pole-changing electric motor as claimed in claim 1 in which said stator winding comprises two pole-amplitude modulation, pole-changing windings providing first, second and third alternative pole-numbers and said rotor angular permeance distribution defines poles corresponding to all said first, second and third pole-numbers.

11. A pole-changing electric motor as claimed in claim 1 in which said stator winding comprises two pole-amplitude modulation pole-changing windings providing first, second, third and fourth pole-numbers and said rotor angular permeance distribution defines poles corresponding to all said first, second, third and fourth pole-numbers.

12. For a pole-changing electric motor as claimed in claim 1, a squirrel cage rotor of ferromagnetic material shaped to provide different permeance values at different angular positions around the rotor axis, defining poles corresponding to at least first and second pole-numbers.

13. For a pole-changing electric motor as claimed in claim 11, a squirrel cage rotor comprising two sets of ferromagnetic laminations spaced apart along the rotor axis, both sets being shaped to provide different permeance values at different angular positions around the axis, said values of the one set defining poles corresponding to said first and second pole-numbers and said values of the other set defining poles corresponding to said third and fourth pole-numbers.

References Cited

UNITED STATES PATENTS

| | | | |
|---|---|---|---|
| 1,957,551 | 5/1934 | Nierlich | 310—162 |
| 2,483,848 | 10/1949 | Saretzky | 310—162 |
| 2,913,607 | 11/1959 | Douglas et al. | 310—162 |
| 3,047,755 | 7/1962 | Angst et al. | 310—162 |

MILTON O. HIRSHFIELD, *Primary Examiner.*

L. L. SMITH, *Assistant Examiner.*